United States Patent [19]

Croft

[11] Patent Number: 4,657,303

[45] Date of Patent: Apr. 14, 1987

[54] INCREMENTAL ADJUSTMENT DEVICE FOR SEAT ASSEMBLIES

[75] Inventor: George Croft, Mississauga, Canada

[73] Assignee: Canadian A.S.E. Limited, Downsview, Canada

[21] Appl. No.: 794,400

[22] Filed: Nov. 4, 1985

[51] Int. Cl.$^4$ ............................................. B60N 1/02
[52] U.S. Cl. ................................. 297/362; 297/373; 297/355
[58] Field of Search ........................ 297/361–367, 297/373, 354, 355; 188/82.2, 83, 68; 192/8 R

[56] References Cited

U.S. PATENT DOCUMENTS

| | | | |
|---|---|---|---|
| 784,272 | 3/1905 | Nagle | 188/83 |
| 1,287,958 | 12/1918 | Giberson | 297/362 |
| 1,861,444 | 6/1932 | Jacobi | 188/68 |
| 2,361,853 | 10/1944 | Lundquist | 297/373 X |
| 2,509,058 | 5/1950 | Haury | 74/531 X |
| 2,660,904 | 12/1953 | Hilsinger, Jr. | 74/531 X |
| 3,099,485 | 7/1963 | Beierbach et al. | 297/373 |
| 3,127,967 | 4/1964 | Fawkes | 192/8 R |
| 3,259,433 | 7/1966 | Werner | 297/367 |
| 3,343,872 | 9/1967 | Werner et al. | 297/362 |
| 3,362,747 | 1/1968 | Fuelling et al. | 297/373 |
| 3,471,892 | 10/1969 | Resag et al. | 297/366 |
| 3,710,418 | 1/1973 | Kratzer | 297/362 |
| 4,009,770 | 3/1977 | Schreyer | 192/8 R |
| 4,143,912 | 3/1979 | Krämer | 297/362 |
| 4,190,138 | 2/1980 | Bendall | 188/82.2 X |
| 4,336,982 | 1/1983 | Bassi | 297/342 |

FOREIGN PATENT DOCUMENTS

| | | | |
|---|---|---|---|
| 1405786 | 1/1969 | Fed. Rep. of Germany . | |
| 2459070 | 6/1975 | Fed. Rep. of Germany | 297/366 |
| 2426960 | 1/1976 | Fed. Rep. of Germany . | |
| 0209630 | 12/1983 | Japan | 297/362 |
| 1207618 | 10/1970 | United Kingdom | 297/366 |

Primary Examiner—Kenneth J. Dorner
Assistant Examiner—Mark W. Binder
Attorney, Agent, or Firm—Rogers & Scott

[57] ABSTRACT

An adjustment device for incrementally adjusting the inclination of a backrest member of a vehicle seat assembly, which backrest member is pivotably mounted with respect to a seat member.

The adjustment device comprises a first hinge bracket rigidly secured to one of the members and a second hinge bracket rigidly secured to the other of the members, wherein the one of said first and second hinge brackets which is connected to the backrest member is pivotally moveable with respect to the other of said first and second hinge brackets. A first gear means is mounted on the first hinge bracket and is operationally connected to the second hinge bracket so as to effect the pivotal movement of the backrest member. A drive means is operationally connected to the first gear means and a control means is operationally connected to the drive means for activation thereof. A locking means is operationally connected to the drive means to resist movement of the drive means, the locking means comprising a first abutment face adapted for co-operation with an opposed second abutment face, the abutment faces providing respective mutually engageable abutment means which, in response to activation of the drive means by the control means, are brought into and out of engagement, thereby defining a series of inclination adjustment positions of the backrest member.

10 Claims, 4 Drawing Figures

INCREMENTAL ADJUSTMENT DEVICE FOR SEAT ASSEMBLIES

BACKGROUND OF THE INVENTION

This invention relates to a device for incrementally adjusting the position of the backrest member of a seat assembly, such as may be employed, for example, in automotive vehicle seat assemblies.

Known backrest adjustment devices typically comprise a first hinge bracket which is attached to the backrest member and a second hinge bracket which is attached to the seat member. The first hinge bracket is pivotably mounted with respect to the second bracket, and an adjustment means, actuated by a control handle, is typically provided for adjustment of the angle of the seatback member to the seat member.

One well known prior art adjustment device having this general arrangement utilizes harmonic gears running one within the other, the larger outer gear having one more tooth on its inner diameter than on the outer diameter of the smaller inner gear. The relative movement of the gears, which is controlled by a control handle operating through a drive shaft, results in a change in the inclination of the backrest member. The sizing and number of teeth of the harmonic gears is selected so as to generate sufficient gear friction to cause a self-locking action that is not overcome by the normal operating forces applied to the gears through the backrest member. Thus, it will be seen with this type of arrangement, that the adjustment means integrally incorporates a locking means to resist pivotal movement of the backrest member once the desired adjustment position is achieved. While this arrangement is simple and inexpensive to manufacture, it is unsatisfactory for a number of reasons. Such devices are inefficient or "sloppy" from a mechanical point of view, thus requiring considerable exertion by the user to overcome the inherent gear friction which holds the backrest member in the adjusted position. Further, because of this inefficiency, most of the occupant's weight must be removed from the backrest member before adjustment can be accomplished. By the nature of their design, these harmonic type of adjustment devices are subject to jamming and to premature wear-out. In addition, for satisfactory working specifications, the gear ratios must be such as to require a large number of turns of the control handle by the user to move the backrest member to a new desired position. This is both inconvenient and tiresome for the user.

Another known form of seatback adjustment device employs a ratchet and a pawl operationally connected one each to the seat member and the backrest member. A return spring biases the backrest member towards the upright "design" position and a handle is used to control the engagement of the pawl with the ratchet. When adjustment of the backrest member from the design position is desired, the handle is actuated to disengage the pawl. The operator, while holding the control handle in the disengaged position, uses his body weight and/or free hand to move the backrest member to the desired adjustment position, whereupon the control handle is released, causing the pawl to re-engage with the ratchet. With this arrangement, the backrest member is freely pivotable during the adjustment procedure and if the pawl fails to properly re-engage the ratchet after adjustment. This is undesireable from a safety standpoint as it may result in pivoting of the backrest member under rapid deceleration as encountered in crash situations.

SUMMARY OF THE INVENTION

It is an object of the present invention to provide an improved backrest adjustment device which overcomes the limitations of the prior art devices discussed above and which allows for quick and efficient incremental adjustment of the inclination of the backrest member of a seat assembly without the need for removal of loading from the backrest member and without allowing for free movement of the backrest member during the adjustment mode.

A further object of the invention is to provide an incremental adjustment mechanism which offers a large range of available inclination settings, the precise number of which can be easily changed by the fabricator to suit specific vehicle applications.

A further object of this invention is to provide a seatback inclination adjustment device which is not subject to jamming or premature wear-out, and which features a simple, rugged construction which is economical to manufacture.

There is thus provided, according to the invention, a device for incrementally adjusting the inclination of the backrest member of a seat assembly with respect to the seat member of the assembly, which device comprises a first hinge bracket rigidly secured to one of said members and a second hinge bracket rigidly secured to the other of said members, wherein the one of said first and second hinge brackets which is connected to the backrest member is pivotably moveable with respect to the other of the first and second hinge brackets.

A first gear means is mounted on the first hinge bracket and is operationally connected to the second hinge bracket so as to affect the pivotal movement of the backrest member upon rotation of the first gear means. A drive means is operationally connected to the first gear means for driving rotation of the first gear means, and a user activated control means is operationally connected to the drive means for selective rotation of the drive means. A position selection means is operationally connected to the drive means to define a plurality of bi-directional rotational positions of the drive means and to resist movement of the drive means from a selected one of said rotational positions. The position selection means comprises a first abutment face rigidly mounted on the hinge bracket and adapted for frictional interaction with an opposed second abutment face connected to the drive means for rotation with said drive means and for limited axial sliding with respect to the first abutment face. Spring biasing means are also provided for slidingly biasing the second abutment face into the aforementioned frictional interaction with the first abutment face. The abutment faces thereby provide respective mutually engageable abutment means which, in response to rotation of the drive means by the control means, and under the influence of the spring biasing means, are brought into and out of such mutual engagement, thereby defining said plurality of rotational positions of the drive means, which plurality of positions in turn define a corresponding plurality of inclination adjustment positions of the backrest member.

In a preferred embodiment of the invention described herein, the first hinge bracket is the one rigidly secured to the seat member and the second hinge bracket is rigidly secured to the backrest member. The drive means comprises a drive shaft with a pinion mounted on the drive shaft for rotation therewith. The first gear means comprises a reducing gear and a drive gear, with the reducing gear and the drive gear both rigidly secured to a shaft that is rotatably mounted on the first hinge bracket. The drive gear meshingly engages with a second gear means, comprised by a toothed segment positioned on one end of the second hinge bracket, so as to establish said operational connection thereto. The pinion is rigidly secured to the drive shaft which shaft is rotatably mounted on the first hinge bracket, with the pinion meshingly engaging the reducing gear. The first and second abutment means of the preferred embodiment are comprised of first and second opposed face gears, the faces of which gears are oriented substantially perpendicularly to the plane of the backrest member. The first face gear is rigidly mounted on the first hinge bracket and the second face gear is mounted on the drive shaft for limited axial sliding movement therealong and for rotation therewith. A spring means, for example an alternating series of flat and spring washers, is provided for biasing the second face gear towards engagement with the first face gear. With this arrangement, the face gears may be brought into and out of engagement in response to rotation of the drive shaft, which rotation is brought about by rotation of the control handle connected thereto.

As the second face gear is connected to the first gear means by the drive shaft at the low torque end thereof, the rotational moment experienced by the second face gear is small compared to originating pivotal moment applied to the backrest member. This being the case, the frictional forces resisting such rotational moment need not be large, with the result that the abutment faces of the two face gears need not be large, and various face gear profiles may be used, allowing for greater flexibility in the range of available inclination settings. That is to say, the adjustment device supplied to a particular vehicle manufacturer may, in many cases, be tailored to meet the manufacturer's specifications for adjustment performance by simply varying the profiles of the face gears without the need for re-designing any additional componentry of the device, as would be necessary with cycloid gears and other prior art adjustment devices. Moreover, cheaper materials and fabrication techniques for manufacturing the face gears may be used than for gears used in the prior art adjustment devices which are exposed to higher rotational moments. For example, the face gears may be moulded by conventional moulding techniques from plastics materials such as ABS plastic. Furthermore, the utilization of an efficient gear reduction means for driving the second hinge member to its adjustment position and a discrete position selection means for holding the seatback in the adjusted position allows for adjustment of the seatback under fully loaded conditions, i.e., with the occupant's weight still on the backrest member. Additionally, the use of an efficient gear reduction means to pivotally drive the backrest member, the gearing of which can be selected within a wide range of acceptable drive ratios, allows for an adjustment device that can be moved through its entire act of rotation with only a few rotations of the control handle.

BRIEF DESCRIPTION OF THE DRAWINGS

In order that the invention may be readily understood, one embodiment thereof will now be described by way of example, with references to the accompanying drawings in which:

FIG. 1 shows a typical vehicle seat assembly 10 of the general type with which the invention may be used. Such a seat assembly is typically of the "bucket" type illustrated, where it is generally sufficient to use a single adjustment device 13 for each seat assembly installed, for example, as shown in the circled area 2 of FIG. 1. The illustrative embodiment will be described with reference to such use, although it will be expressly understood by those skilled in the art that specific vehicle applications may call for the analogous use of two or more incremental adjustment devices with each vehicle seating assembly. Should such an application be required, the two devices would be mechanically linked by a common drive shaft (not shown).

Figures 1, 3:
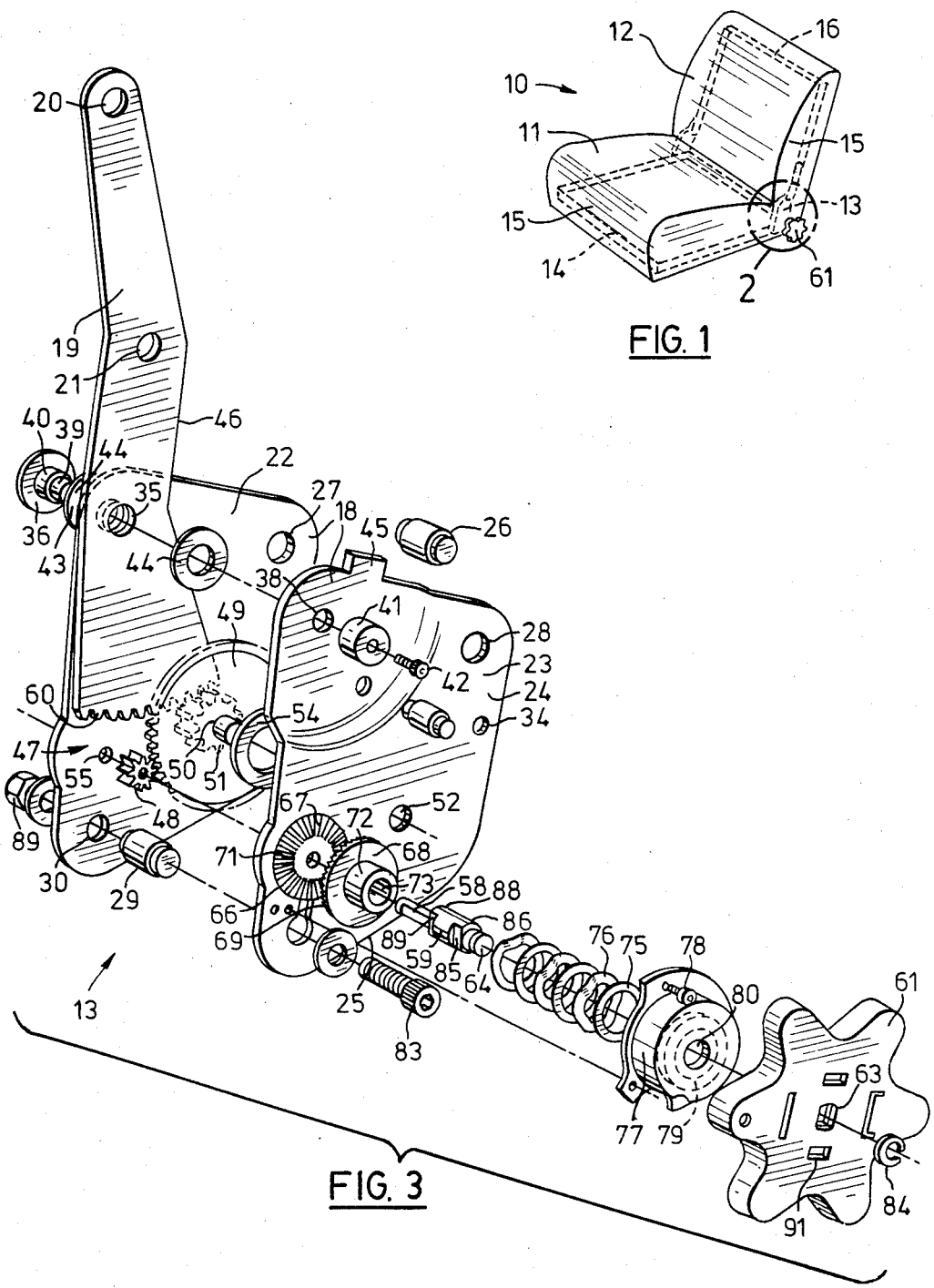
FIG. 1 is a perspective view of a vehicle seat assembly incorporating the instant invention.
FIG. 3 is an exploded view of the adjustment device of FIGS. 1 and 2.

The vehicle seat assembly 10 of FIG. 1 has a backrest member 12 which is pivotably mounted with respect to a seat member 11. The seat member 11 comprises a seat support frame 14 which is anchored by conventional means to the floor panels (not shown) of the vehicle and which is covered in the usual manner with upholstery materials 15. The backrest member 12 comprises a support frame 16 which is also covered in the usual manner with upholstery materials 17.

The incremental adjustment device 13 comprises a first hinge bracket 18 which is rigidly connected by usual fastening means, such as nut 94 and bolt 93 assembly, to a free end of the seat support frame 14. Alternatively, the inner plate 22 may be formed as an integral component of the support frame 14. A second hinge bracket 19 is provided with apertures 20, 21 for receiving nuts and bolts, rivets, etc., (not shown) to rigidly secure the bracket 19 to the support frame 16 of the backrest member 12. Other conventional fastening means, such as spot welding, may be used with equal facility. It is also possible to have hinge bracket 19 formed as an integral component of the support frame 16.

The first hinge bracket 18 comprises an inner hinge plate 22 and an outer hinge plate 23, which plates are substantially parallel to one another. It will be appreciated from the Figures that when the device is mounted on the seat assembly as shown in FIG. 1, surface 24 of the outer plate 23 faces outwardly from the seat assembly of FIG. 1 and edge 25 of the outer plate 23 is oriented downwardly there from. The inner 22 and outer 23 plates are maintained at a defined distance from each other by means of a first double shouldered spacer or rivet 26, which is positioned between apertures 27 and 28, and by a second double shouldered spacer or rivet 29, which is positioned between apertures 30, 31. Further rigidity is added to the plate sandwich which forms the first hinge bracket 18 by means of a third rearwardly mounted double shouldered spacer or rivet 32, positioned between apertures 33, 34. The first 26 and second 29 spacers may be of hollow construction (as shown), in which case bolts 83 or other fastening means may pass therethrough so as to rigidly affix the first hinge bracket 18 to the seat support frame 14 as previously discussed. Where the spacers 26 and 29 are solid, common rivets may be used to hold hinge plate 22 in spaced relation to hinge plate 23 and other common affixation means, such as rivets, welding, etc. may be used to rigidly affix the first hinge bracket 18 to the seat support frame 14.

The second hinge bracket 19 is pivotally mounted between the inner 22 and outer 23 hinge plates so as to be pivotally moveable with respect to the first hinge bracket 18. As illustrated in the Figures, the second hinge bracket 19 is provided with an aperture 35, and the inner 22 and outer 23 hinge plates are provided with corresponding apertures 37, 38, respectively. As illustrated, a pivot pin 36, having a raised shoulder 40, and a narrowed free end 39, passes through the aperture 37 in plate 22 and through the aperture 35 in hinge bracket 19. The hinge bracket 19 pivots about the raised shoulder 40, while the narrowed free end 39 passes through aperture 35, which is of a suitably smaller diameter than apertures 37 or 38, where the free end 39 is held against hinge plate 23 by means of shoulder cap 41 and allen screw 42, which screw is threaded into the free end 39. Washers 43 and 44 are positioned on either side of the second hinge bracket 19 to provide suitable spacing with the inner 22 and outer 23 hinge plates, respectively. The pivot pin may be a shouldered rivet as shown, or may take the form of a bushing or sleeve surrounding a bolt or other fastening means.

The rotational angle through which the second hinge bracket 19 may pivot in the rearward (reclining) direction is limited by abutment member 45, being a generally horizontal prong integrally formed on hinge plate 23. That is, when the backrest member 12 is in its fully reclined position, as represented by the position of the bracket 19 shown in FIG. 2, further reclining pivotal movement is prevented by contact of the rearward edge 46 of the bracket 19 with the forward edge of the abutment member 45. The rotational angle through which the second hinge bracket 19 may pivot in the forward (inclining) direction is limited by the first spacer element 26. That is, when the backrest member 12 is in its fully inclined position (not shown), further inclining pivotal movement is prevented by contact of the rearward edge 46 of the bracket 19 with the forward edge of the first spacer element 26.

As will be seen most clearly in FIG. 3, a first gear means, generally designated by the reference numeral 47, is mounted on the first hinge bracket 18 between the substantially parallel hinge plates 22 and 23 in a manner to be described. The first gear means 47 comprises a reducing gear 49, and a drive gear 50. The reducing gear 49 and the drive gear 50 are rigidly secured by any conventional means to a shaft 51, which shaft is rotatably mounted on the first hinge bracket 18 by means of aligned apertures 52 positioned one each on the inner 22 and outer 23 hinge plates, which apertures 52 each accept a reduced diametered end 53 of the shaft 51 for journalling therein. A spacer washer 54, of, for example, nylon material, is preferably positioned between the reducing gear 49 and the outer hinge plate 23. Reducing gear 49 is of larger diameter than drive gear 50, a typical operative gear ratio for these two gears being 3:1.

A pinion 48, which is of small diameter and of fewer teeth than either drive gear 50 or reducing gear 49, is rigidly secured by any conventional means to a first narrowed diameter portion 58 of a drive shaft 57 for rotation with the drive shaft 57. The first hinge bracket 18 by means of aligned apertures 55, 56 is positioned in the inner 22 and outer 23 hinge plates, respectively. A C-clip 83 engages a groove (not shown) encircling the free end 82 of the drive shaft 57, with a spring washer 83 lying thereunder. In this manner, the first narrowed portion 58 of the drive shaft 57 is journalled in the apertures 55 and 56 on opposite sides of the pinion 48. The pinion 48 and drive shaft 57 together comprise a drive means. The pinion 48 is positioned on the drive shaft 57 so as to meshingly engage the reducing gear 49. In this manner, the drive means is operationally connected to the first gear means.

Figure 2:
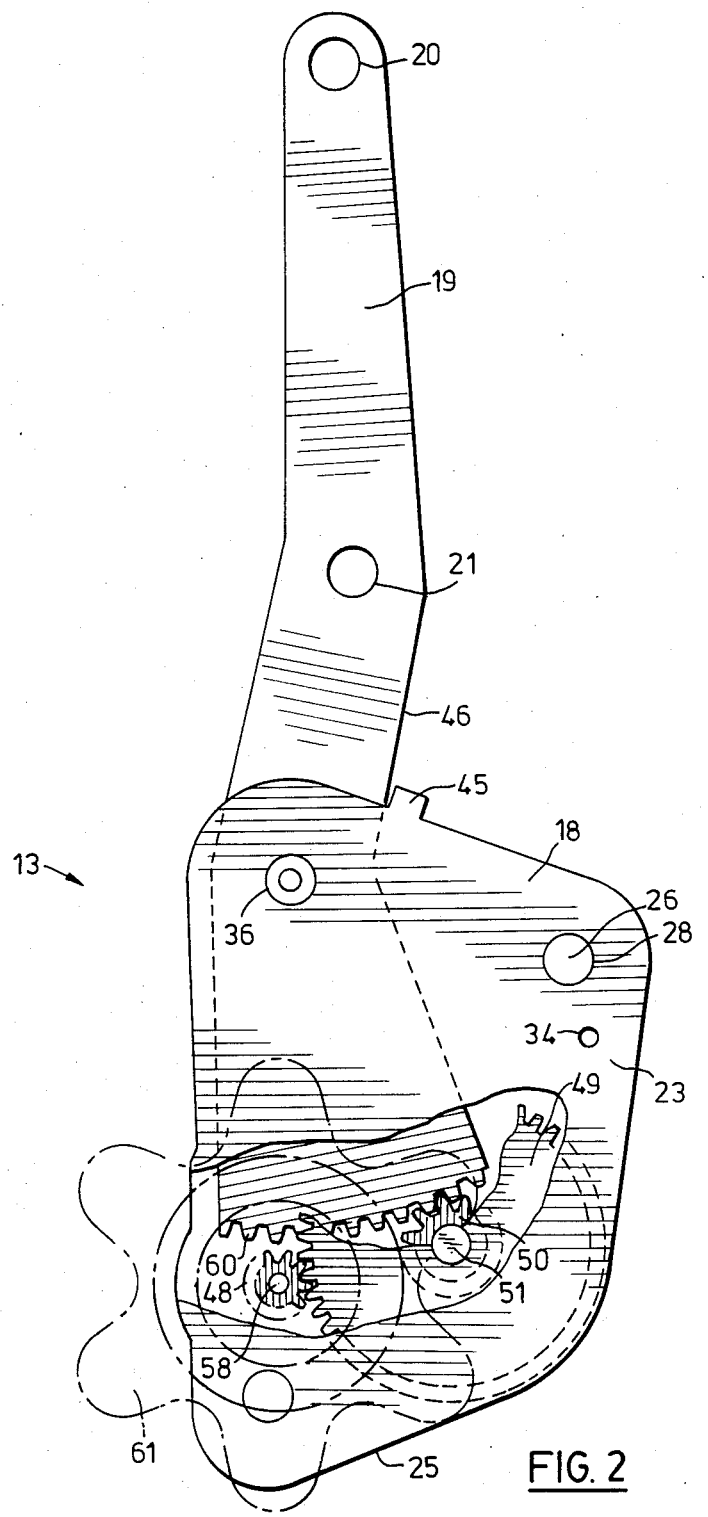
FIG. 2 is a partial sectional elevation of one embodiment of an incremental locking device according to the instant invention.
Figure 4:
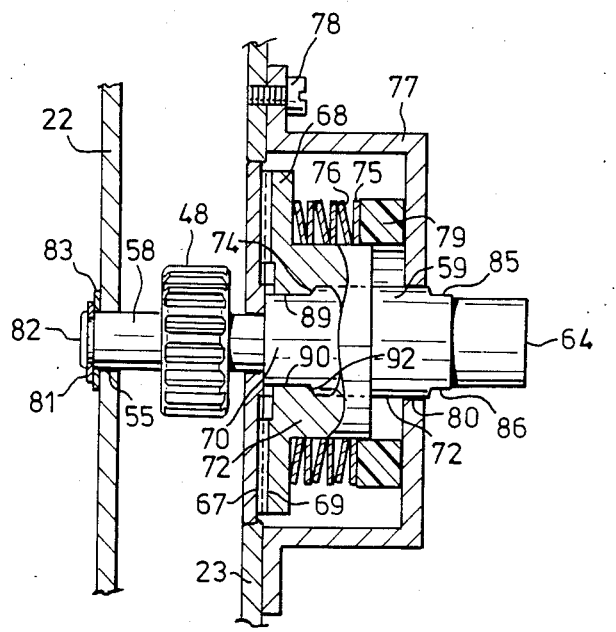
FIG. 4 is a partial sectional view along line 4—4 of FIG. 3.

Second gear means, in the form of a toothed segment 60, is provided at the lower end of the second hinge bracket 19, as seen in FIGS. 2 and 3. The purpose of the second gear means is to establish an operational connection between the first gear means 47 and the second hinge bracket 19, so as to effect pivotal movement of the hinge bracket 19. Equivalent arrangements are easily envisioned and are within the scope of this invention.

A control means, in the form of a control handle 61, is rigidly affixed to the enlarged diametered portion 59 of the drive shaft 57 so as to allow for turning of the drive shaft 57 by means of the control handle 61. Although any conventional method of rigidly affixing the control handle to the drive shaft 57 may be used, the method shown utilizes an interference fit between a first drive shaft portion 62 having diametrically opposed flats 85, 86 and a mating aperture 63 in the control handle 61. A C-ring clip 84 grips a channel (not shown) in a second narrowed diameter portion 64 of the drive shaft 57, which portion 64 protrudes through the aperture 63. A cover plate (not shown) can be mounted on the end of control handle 61 by means of slots 91, to cover the C-clip 84. In this manner, the control handle 61 is operationally connected to the drive means for rotation thereof by the seat occupant when adjustment of the backrest member 12 is desired.

A locking means, generally designated by the reference numeral 65, is operationally connected to the drive shaft 57 to resist rotational movement thereof. More specifically, the position selection means 65 comprises a first face gear 66 having a first abutment face 67 and a second opposed face gear 68 having a second abutment face 69, wherein the first face gear 66 is rigidly mounted, (i.e. is integral with) the outer plate 23 of the first hinge bracket 18 and the second face gear 68 is axially and rotatably mounted on a second drive shaft portion 70, having diametrically opposed flats 87, 88. The first 67 and second 69 abutment faces illustrated are substantially perpendicular to the plane of the backrest member 12 and provide mutually engageable abutment means in the form of congruent teeth 71 on their respective faces. The teeth 71 shown are of conventional profile, but may take many forms, including a sinusoidal waveform. In fact, it will be preferable to use such a waveform profile for the mutually engageable abutment means on the abutment faces 67 and 69 where less dense or more brittle materials such as ABS plastics are used in their fabrication, if premature breakage or wear-out is to be avoided. Moreover, the use of conventional teeth profiles as illustrated results in the generation of a louder, higherpitched noise during the adjustment process which noise may be unacceptable to some vehicle manufacturers. In such case, the waveform profile will also be preferred. The choice of teeth profiles and their number will dictate the number of inclination adjustment positions of the device, and can be varied as required for particular vehicle applications.

The second face gear 68 is mounted on the drive shaft 57 for limited axial sliding movement therealong and for rotation therewith in the following manner. The second face gear 68 has an internal bore 73 which is dimensioned to slidingly engage the enlarged diameter portion 59 of the drive shaft 57 so as to allow axial sliding movement of the face gear 68 with respect to the enlarged drive shaft portion 59. The bore 73 terminates at one end in a collar portion 72 that is, by reason of the presence of diametrically opposed flats 89, 90, complementary in cross-section to the second shaft portion 70 of the drive shaft 57 so as to mate therewith. This complementary dimensioning causes the second face gear 68 to rotate with the drive shaft 57 while at the same time permitting axial sliding movement of the face gear 68 along the drive shaft 57. This axial sliding is limited in one direction by contact of the second abutment face 69 with the first abutment face 67 and in the other direction by contact of the shoulder 74 of the collar portion 72 with the shoulder 92 of the enlarged diameter shaft portion 59. A spring means, comprising an alternating series of flat 75 and spring 76 washers is provided for biasing the second face gear 68 towards engagement with the first face gear 66. These washers are positioned around the drive shaft 57 between the second face gear 68 and a spacing washer 79 of, for example, nylon material, which washer 79 lies beneath covering boss 77 which boss is removably attached to the outer hinge plate 23 by affixation means such as allen screws 78. The enlarged portion 59 of the drive shaft 57 is optionally journalled for rotation in a complementary aperture 80 of the boss 77.

In operation, when adjustment of the backrest member 12 is desired, the occupant activates the drive means by turning the control handle 61 in the desired direction. That is, as shown in the Figures, turning the control handle 61 in the clockwise direction causes the backrest member 12 to recline. Conversely, turning the control handle 61 in the counter-clockwise direction causes the backrest member 12 to incline. More specifically, rotation of the control handle 61, which is rigidly attached to the drive shaft 57, causes the drive shaft 57 to rotate, which in turn drives pinion 48. The pinion 48 in turn drives the reducing gear 49, which is rigidly connected to shaft 51. Accordingly, drive gear 50 rotates in meshing engagement with the toothed segment 60, thereby pivotally moving the second hinge bracket 19 and the attached backrest member 12 with respect to the first hinge bracket 18 and its attached seat member 11. The rotational force applied by the seat occupant must be sufficient to cause the teeth 71 of the second face gear 68 to ride up and over the opposed teeth of the first face gear 66, making a slight clicking sound, and thus defining one of the series of available inclination adjustment positions of the backrest member 12. By reason of the interposition of the gear reduction device constituted by the first gear means, as previously mentioned, the counter-rotational forces on the drive shaft 57 will be small, and the main force to be overcome by the occupant will be the frictional force between the teeth 71 on the first 66 and second 68 face gears, which forces are directly proportional to the strength of the spring means 75 and loading on the backrest member 12.

It will be understood that the invention is not to be limited to the exact construction shown and described, but that various changes and modifications may be made without departing from the spirit and scope of the invention as described in the appended claims.

I claim:

1. In a vehicle seat assembly having a backrest member pivotably mounted with respect to a seat member, a device for incrementally adjusting the inclination of the backrest member with respect to the seat member, which device comprises:
   (a) a first hinge bracket rigidly secured to one of said members and a second hinge bracket rigidly secured to the other of said members, wherein the one of said first and second hinge brackets which is connected to the backrest member is pivotally moveable with respect to the other of said first and second hinge brackets;
   (b) a first gear means mounted on said first hinge bracket and operationally connected to the second hinge bracket so as to effect said pivotal movement upon rotation of said first gear means;
   (c) drive means operationally connected to the first gear means for driving rotation of said first gear means;
   (d) user activated control means operationally connected to the drive means for selective rotation of the drive means;
   (e) position selection means operationally connected to the drive means to define a plurality of bi-directional rotational positions of the drive means and to resist movement of the drive means from a selected one of said rotational positions, said position selection means comprising:
      (i) a first abutment face rigidly mounted on the first hinge bracket and adapted for frictional interaction with an opposed second abutment face connected to the drive means for rotation therewith and for limited axial sliding with respect to said first abutment face; and,
      (ii) Spring biasing means for slidingly biasing said second abutment face into said frictional interaction with the first abutment face;
   said abutment faces providing respective mutually engageable abutment means which, in response to rotation of the drive means by the control means, and under the influence of said spring biasing means, are brought into and out of mutual binding engagement, thereby defining said plurality of rotational positions of the drive means, which plurality in turn defines a corresponding plurality of inclination adjustment positions of the backrest member.

2. A device as claimed in claim 1 wherein the first hinge bracket is rigidly secured to the seat member and the second hinge bracket is rigidly secured to the backrest member.

3. A device as claimed in claim 2, wherein said first gear means comprises a reducing gear and a drive gear, wherein the reducing gear and the drive gear are both rigidly secured to a shaft that is rotatably mounted on said first hinge bracket; the drive gear meshingly engages with a second gear means positioned on the second hinge bracket so as to establish said operational connection thereto.

4. A device as claimed in claim 3, wherein said drive means comprises a drive shaft and a pinion rigidly secured to said drive shaft which shaft is rotatably mounted on the first hinge bracket, with the pinion meshingly engaging said reducing gear, so as to establish said operational connection to said first gear means.

5. A device as claimed in claim 4, wherein said second gear means comprises a toothed segment provided on one end of the second hinge bracket.

6. A device as claimed in claim 5, wherein said first and second abutment means comprise first and second opposed face gears, respectively, wherein the second face gear is mounted directly onto the drive shaft for limited axial sliding movement therealong and for rotation therewith; and, wherein the spring means directly bias the second face gear towards engagement with the first face gear.

7. A device as claimed in claim 6, wherein said spring means comprises an alternating series of flat washers and spring washers.

8. A device as claimed in claims 6 or 7, wherein said first and second face gears are oriented substantially perpendicularly to the plane of the backrest member.

9. A device as claimed in claim 1, 4 or 7, wherein the first hinge bracket comprises two substantially parallel plates between which the first gear means is positioned, at least one of which parallel plates is rigidly secured to the seat member.

10. An incremental adjustment device for use in a seat assembly having a backrest member pivotally mounted with respect to a seat member, said adjustment device comprising:
(a) a first hinge bracket rigidly secured to one of said members and a second hinge bracket rigidly secured to the other of said members, wherein the one of said first and second hinge brackets which is connected to the backrest member is pivotally moveable with respect to the other of said first and second hinge brackets;
(b) a first gear means mounted on said first hinge bracket and operationally connected to the second hinge bracket so as to effect said pivotal movement;
(c) drive means operationally connected to the first gear means;
(d) user control means operationally connected to the drive means for rotation thereof;
(e) position selection means operationally connected to the drive means to define a plurality of bi-directional rotational positions of the drive means and to resist movement of the drive means from a selected one of said rotational positions, said position selection means comprising:
(i) a first abutment face rigidly mounted on the first hinge bracket and adapted for frictional interaction with an opposed around abutment face connected to the drive means for rotation therewith and for limited axial sliding with respect to said first abutment face; and,
(ii) Spring biasing means for slidingly biasing said second abutment face into said frictional interaction with the first abutment face;

said abutment faces providing respective mutually engageable abutment means which, in response to rotation of the drive means by the control means, and under the influence of said spring biasing means, are brought into and out of mutual binding engagement, thereby defining said plurality of rotational positions of the drive means, which plurality in turn defines a corresponding plurality of inclination adjustment positions of the backrest member.

* * * * *